United States Patent [19]

Chester

[11] 4,341,926
[45] Jul. 27, 1982

[54] APPARATUS FOR THE DIRECT CONNECTION OF ANCILLARY EQUIPMENT TO THE TELEPHONE NETWORK

[75] Inventor: Douglas R. Chester, Orlando, Fla.

[73] Assignee: Exxon Research & Engineering Co., Florham Park, N.J.

[21] Appl. No.: 147,723

[22] Filed: May 8, 1980

[51] Int. Cl.³ .......................................... H04M 11/00
[52] U.S. Cl. ................................. 179/2 C; 179/2 DP
[58] Field of Search .................... 179/1 C, 2 C, 2 DP, 179/3, 4; 178/2 R, 3 R, 4.1 R

[56] References Cited

U.S. PATENT DOCUMENTS 3,277,243 10/1966 Fairbairn ............................ 179/1 C
4,055,729 10/1977 Vandling ............................ 179/2 C Primary Examiner—Joseph A. Popek
Attorney, Agent, or Firm—Norman L. Norris; Kenneth Watov

[57] ABSTRACT

Apparatus and method for the direct connection of a facsimile transceiver or other ancillary apparatus to the telephone network is disclosed. The connection is made by removing the microphone from a telephone hand set and substituting therefor a microphone. Conductors are interposed between the microphone and the contacts within the hand set to enable connection of a facsimile transmitter or other ancillary equipment thereto while the telephone remains normally useable even after this modification. The modification which can be performed without tools and in a very short time, thus enabling ready connection of facsimile equipment without the use of an acoustic coupler even when the telephone is not connected to the telephone network by a means of a standard jack or plug.

11 Claims, 5 Drawing Figures

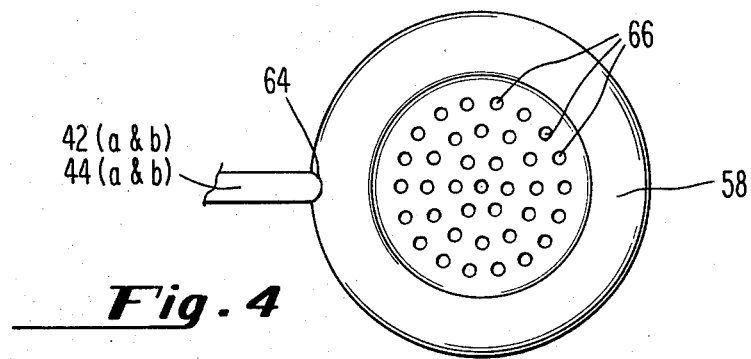
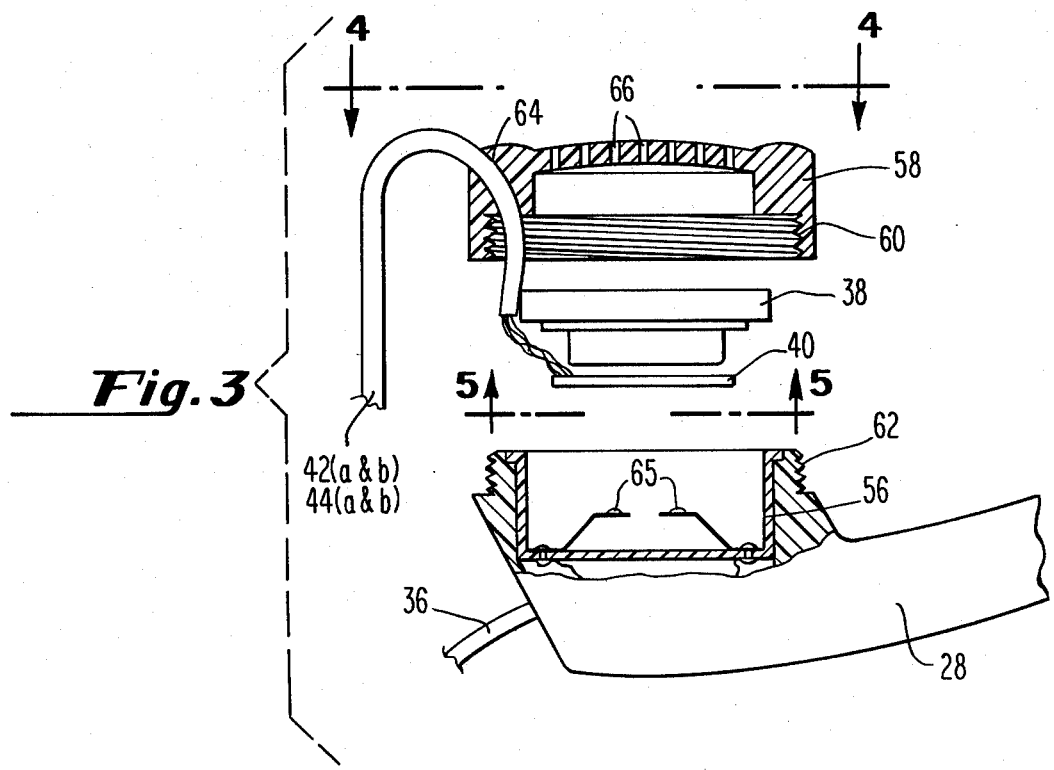
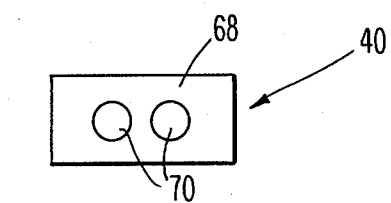

APPARATUS FOR THE DIRECT CONNECTION OF ANCILLARY EQUIPMENT TO THE TELEPHONE NETWORK

BACKGROUND OF THE INVENTION

This invention relates to the direct connection of ancillary equipment such as facsimile transceivers to the telephone network.

In many instances, it is necessary for various types of ancillary equipment including data terminals and facsimile transceivers to be directly connected to the switched telephone network, as contrasted with acoustic coupling, in order to satisfy certain wideband communication channel and operator convenience requirements.

Typically, such direct connection is accomplished by a plug and jack connection to the telephone network with suitable protective circuitry interposed between the ancillary equipment and the telephone network as, for example, required by the FCC in connection with the FCC equipment registration program. However, in many instances, a jack is not available and the only available form of connection to the network is through a telephone handset which is hardwired to the network. Under such circumstances, users of the telephone network have been forced to acoustically couple the ancillary equipment to the network through the telephone handset which may be undesirable for the reasons stated above.

SUMMARY OF THE INVENTION

It is an object of this invention to provide apparatus for direct coupling ancillary equipment to the telephone network through a hardwired telephone hand set.

It is a further object of this invention to direct couple ancillary equipment to the telephone network while still providing suitable protection for the telephone network.

It is a further object of this invention to direct couple ancillary equipment to the telephone network without substantially mechanically altering the telephone handset, and still allowing use of the telephone instrument in the conventional manner.

In accordance with these and other objects of the invention, a preferred embodiment of the invention comprises ancillary equipment such as facsimile means and a telephone hand set including transducer means and means connected to the telephone network through a first flexible conductor means extending from the handset. A second flexible conductor means is connected to the transducer means and also extends from the telephone hand set. A third flexible conductor means is connected to the connective means and extends from the telephone hand set. Switch means selectively connect the facsimile means through the second flexible conductor means and the third flexible conductor means for coupling facsimile or voice signals respectively to the telephone network.

In the preferred embodiment, the first and second flexible conductor means are attached at one end to a first connector and the facsimile means comprises a second connector of a type adapted to mate with the first connector. Preferably, the hand set comprises a mouthpiece, the transducer comprises a microphone juxtaposed to the mouthpiece with the mouthpiece including an opening so as to permit a second and third flexible conductor means to extend therefrom.

In the preferred embodiment of the invention, the connective means include a pair of contacts adapted to electrically connect with the contacts associated with the microphone of the telephone hand set.

BRIEF DESCRIPTION OF THE DRAWINGS

FIG. 3 is an exploded sectional view of the portion of the telephone hand set shown in FIG. 1;

FIG. 4 is a view taken along line 4—4 of FIG. 3;

FIG. 5 is a view taken along line 5—5 of FIG. 3.

DETAILED DESCRIPTION OF THE PREFERRED EMBODIMENT

Figure 1:
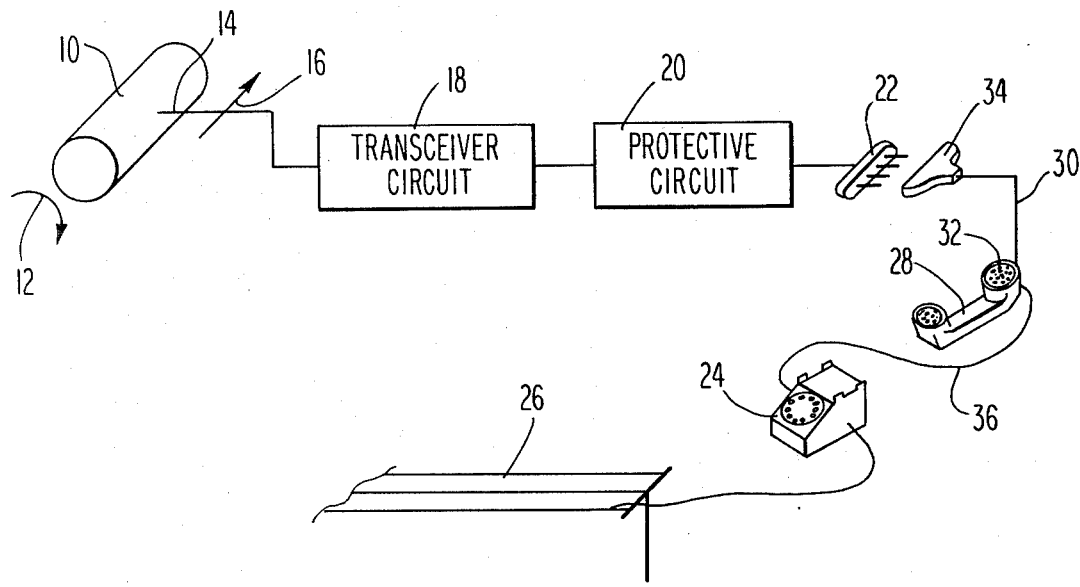
FIG. 1 is a block diagram of the preferred embodiment of the invention comprising a facsimile apparatus directly connected to the telephone network.

Referring to the system shown in FIG. 1, ancillary equipment in the form of a facsimile transceiver comprises a drum 10 rotated by a motor, not shown, in a direction depicted by an arrow 12 so as to create a relative scanning motion between a document or copy medium carried by the drum 10 and a scanning head 14. The scanning head 14 is advanced axially along the drum 10 as indicated by an arrow 16 and the drum rotates about its axis as indicated by the arrow 12 such that successive paths on the document or copy medium are placed in communication with suitable transducers carried by the head 14.

Signals to and from the head 14 are applied from and to a transceiver circuit 18 including typical amplification and demodulator/modulator circuitry of the type disclosed in U.S. Pat. Nos. 4,015,077 and 4,112,468 which are incorporated herein by reference. The transceiver circuit 18 is coupled to a protective circuit 20 of the type disclosed in U.S. Pat. No. 4,055,729 which is also incorporated herein by reference. A connector 22, preferably of multiwire type which can only be connected in one way with a mating connector, such as that sold under the trade name "Molex," is connected to the protective circuit 20.

In accordance with this invention, a telephone hand set 24 which is directly connected to the telephone network 26 includes a handpiece 28 having a flexible conductor means 30 extending from the mouthpiece 32 and connected to a female connector 34 of the type adapted to mate with male connector 22. As will now be described in detail, both voice and facsimile signals are transmitted through the flexible conductor means 30 to the mating connectors 22 and 34 so as to provide direct connection to the telephone network 26 through the hand set 28, the telephone instrument base 24 and a flexible conductor means 36 which extends between the hand set 28 and the telephone instrument base 24.

Figure 2:
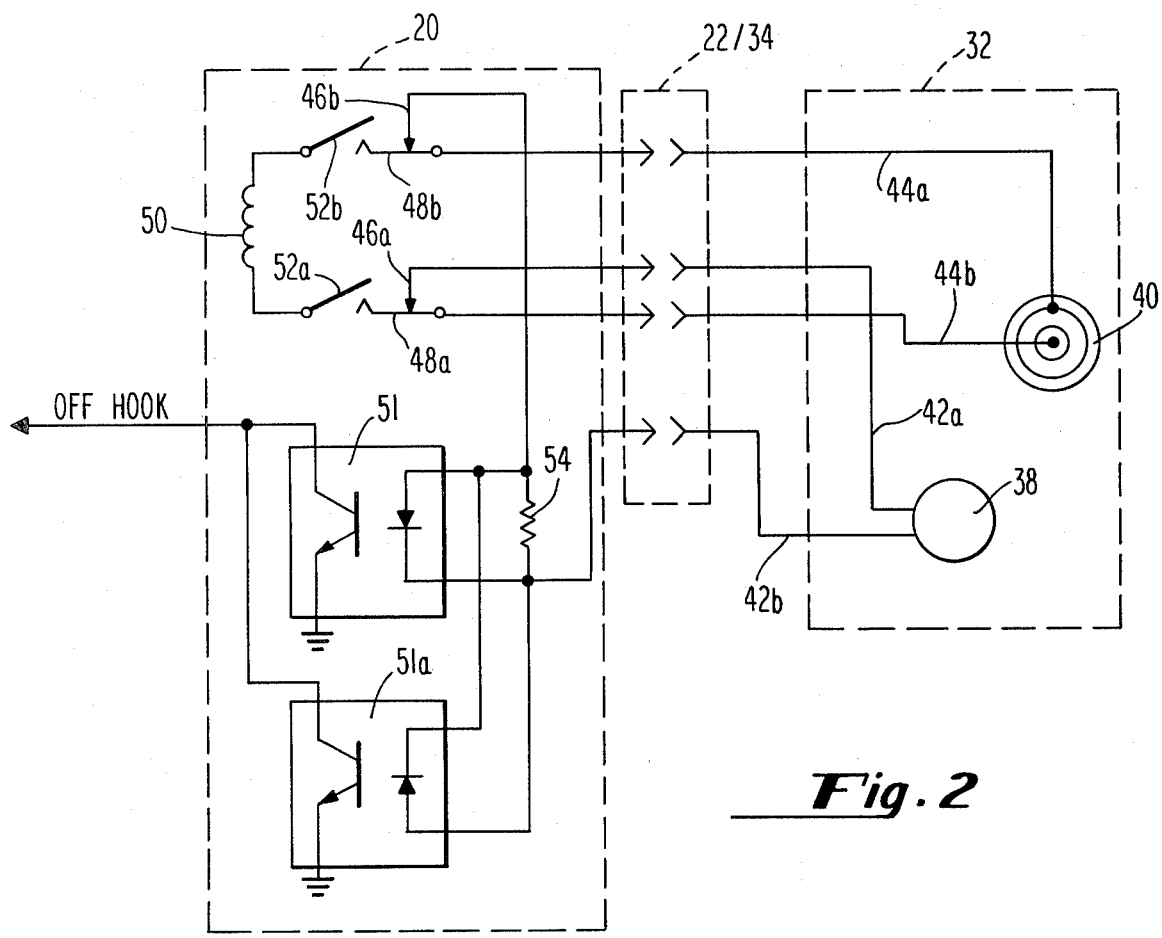
FIG. 2 is a schematic diagram of portions of the block diagram of FIG. 1.

Referring to FIG. 2, portions of the protective circuit 20, the male/female connectors 22/34, and the mouthpiece 32 are depicted. With respect to the mouthpiece 32, a microphone 38 is associated with a connective means 40 for purposes of coupling both voice and facsimile signals to the telephone network. The voice signals generated by the microphone 38 which comprises an electrical/acoustic transducer are connected to the mating connectors 22/34 through a pair of flexible conductors 42a and 42b. The connective means 40 are similarly connected to the connectors 22/34 through a pair of flexible conductors 44a and 44b. The two contacts of the male connector 22 associated with the flexible conductors 42a and 42b are in turn connected to contacts 46a and 46b respectively so as to connect the microphone 38 to the connective means 40 back through contacts 48a and 48b respectively and flexible leads 44a and 44b. In other words, the voice signals are actually transmitted from the microphone 38, across the connectors 22/34, to the protective circuit 20 and then back to the connective means 40 mounted within the mouthpiece 32.

The protective circuit 20 further comprises a transformer winding 50 which is connected between contacts 52a and 52b associated with the contacts 48a and 48b respectively. The winding 50 provides isolation of the transceiver circuitry 18 from the telephone instrument base 24 and the telephone network 26. When a relay controlling the contacts 52a and 52b is triggered, the winding 50 is connected across the contacts 48a and 48b so as to directly connect the transceiver circuit 18 to the connective means 40. In this manner, facsimile signals can be coupled directly to the telephone network through the connective means 40. At the same time, positioning of the relay contacts 52a and 52b so as to engage the contacts 48a and 48b will disengage the contacts 46a and 46b thereby disconnecting the microphone 38. This assures that no acoustical noise picked up by the microphone 38 can be transmitted to the telephone network 26 while the facsimile signals are being transmitted through the telephone network 26.

Preferably, the position of the relay contacts 52a and 52b and the contacts 48a and 48b are controlled by the facsimile transceiver. As disclosed in the above-mentioned U.S. Pat. No. 4,055,729, the position of these relay contacts may be controlled by opening and closing the facsimile transceiver cover, and this patent is therefore incorporated by reference herein.

As also shown in FIG. 2, the protective circuit 20 includes a resistor 54 and optocouplers 51 and 51a which are connected between the contact 46b and the flexible lead 42b. This resistor 54 in combination with the optocouplers 51 and 51a provides an optional "off hook" signal to the facsimile transceiver control circuitry.

Reference will now be made to FIGS. 3–5 for a discussion of the hand set 28. As disclosed therein, the hand set 28 includes a cup 56 which is adapted to receive microphone 38 and the connective means 40. The microphone 38 and the connective means 40 may be fixedly attached to one another so as to permit the easy insertion of microphone 38 and the connective means 40 in place of a microphone normally associated with the handset 24. The microphone 38 and the connective means 40 are adapted to be received within the cup 56 and are retained there by a mouthpiece cap 58 having threads 60 which threadedly engage the threads 62 on the hand set 28 adjacent to the cup 56. The hand set 28 includes contacts 65 which are connected to the first pair of flexible conductors 36 leading away from the hand set 28. The second pair of flexible conductors 42a and 42b which are electrically connected to the microphone 38, and the third flexible conductor means 44a and 44b which are electrically connected to the connective means 40, extend through an opening 64 in the mouthpiece cap 58 as perhaps best shown in FIGS. 3 and 4. It will also be appreciated from FIG. 4 that the cap 58 includes a plurality of openings 66 for acoustic transmission.

The connective means 40 as shown in FIGS. 3 and 5 comprises a small printed wire board 68 having a pair of contacts 70 adapted to engage the contacts 65 of the hand set 28. Contacts 70 are, of course, directly connected to flexible conductors 44a and 44b as shown in FIG. 2.

It will be appreciated by those skilled in the art that the modification of a standard telephone hand set to operate in accordance with this preferred embodiment of the invention is a simple matter, requiring only disassembly of the hand set, removal of the microphone, and replacement thereby with a second microphone having connective means 40 attached thereto. A replacement cap having a hole or slot for the connecting wires is used for reassembly. By coupling the male/female connectors, a facsimile unit is thus connected to the telephone network without use of an acoustic coupler regardless of whether the telephone is connected to the network by a wall plug or jack or by a hard-wired connection, thus allowing additional versatility in the use of the invention. Moreover, the telephone remains useful in the usual fashion without further modification; upon deactivation of the relay controlling connection of the protective circuit by, e.g., ending a facsimile transmission, the telephone is connected normally.

In the preferred embodiment of the invention, the ancillary equipment comprises a facsimile transceiver. It will, of course, be appreciated that different types of ancillary equipment are well adapted for use with the invention and other embodiments thereof. It will also be appreciated that other modifications may be made without departing from the true spirit and scope of the invention as set forth in the appended claims.

What is claimed is:

1. Apparatus for coupling facsimile means to a telephone network comprising:
   a telephone handset including transducer means and connective means connected to the telephone network, said telephone handset including a first flexible conductor means extending from said handset to said network;
   a second flexible conductor means connected to said transducer means and extending from said telephone handset;
   a third flexible conductor means connected to said connective means and extending from said telephone handset; and
   switch means for selectively connecting said facsimile means or said second flexible conductor means to said third flexible conductor means for coupling facsimile or voice signals to the telephone network, said switch means being controlled by operation of said facsimile means.

2. The apparatus of claim 1 wherein said second and third flexible conductor means are attached at one end to a first connector and said facsimile means comprises a second connector including means for mating with said first connector.

3. The apparatus of claims 1 or 2 wherein said handset comprises a mouthpiece and said transducer means comprises a microphone juxtaposed to said mouthpiece.

4. Apparatus adapted to connect ancillary equipment to a telephone network through a telephone handset comprising a cup, a first microphone adapted to be received within said cup and a first threaded mouthpiece cap adapted to threadedly engage said cup, said handset and said microphone including mutually abutting electrical contacts, said apparatus comprising:

a second threaded mouthpiece cap including an opening, said second threaded mouthpiece cap adapted to threadedly engage said handset, said second threaded mouthpiece cap replacing said first threaded mouthpiece cap;

a flexible conductor means extending through said cap opening;

a second microphone replacing said first microphone, the former being adapted to fit within the cap of said second mouthpiece and electrically connect to said flexible conductor means;

connective means electrically connected to said second microphone and to said flexible conductor means;

said connective means including additional contact means electrically connected to said flexible conductor means and adapted to abut said electrical contacts of said handset; and means electrically connected to said flexible conductor means, and controlled by said ancillary equipment for selectively connecting either said ancillary equipment or said second microphone to said telephone network.

5. The apparatus of claim 4 wherein said flexible conductor means comprises two pairs of conductors, one of said pairs being electrically connected to said contacts through additional contact means of said connective means, the other of said pairs being electrically connected to said second microphone.

6. The apparatus of claim 5 wherein said connective means comprises a rigid member upon which said additional contact means are mounted.

7. The apparatus of claim 4 wherein said connective means is rigidly attached to said second microphone.

8. Method for the connection of ancillary equipment to a telephone network through a telephone handset, said handset comprising a cup, a first microphone adapted to be received within said cup and to be in contact with contactor means disposed within said cup, and a first cap adaptor for engagement with said cup and to secure said first microphone in contact with said contactor means, comprising the steps of:

providing conductor means being adapted to be connected to said ancillary equipment;

providing a second cap adapted for engagement with said cup, and having an opening formed therein to allow passage or said conductor means therethrough;

providing a second microphone for replacing said first microphone;

providing conductive means connected to said conductor means and adapted to be interposed between said second microphone and said contactor means;

providing means for alternatively connecting either said ancillary equipment or said second microphone to said network;

removing said first cap from said handset;

removing said first microphone from contacting said contactor means;

assembling said conductive means between said second microphone means and said contactor means;

assembling said second cap to engage said cup; and wherein said means for alternatively connecting is controlled by said ancillary equipment.

9. The method of claim 8 further including the step of rigidly attaching said conductive means to said microphone means.

10. Apparatus for connecting ancillary transmission apparatus to a telephone handset, said handset being of the type comprising a first substantially circular microphone cap, threadedly connected to an elongated handpiece having a recess formed in one end thereof for retainment of a first microphone upon threaded connection of said cap thereto, and for retainment of a pair of contacts for electrical connection to said microphone, said contacts also being connected to conductors of an electrical cable for connection to a telephone network, said apparatus for connecting ancillary apparatus to said handset comprising:

a second substantially cylindrical cap similar to said first microphone cap and adapted for threaded connection to said handpiece;

a second microphone adapted to be received within said cap; and connection means including insert means adapted to be disposed within said recess in said handpiece for electrical connection to said electrical contacts and for electrically isolating said second microphone from said contacts, said connection means also including means electrically connected to said second microphone, said connection means being operable for selectively connecting either said ancillary apparatus or said second microphone to the telephone network.

11. The connection means of claim 10 further comprising switch means, external to said handset, connected to and controlled by operation of said ancillary equipment to alternatively connect said microphone or said ancillary equipment to the telephone network; and flexible conductor means for electrically connecting said switch means to said insert means and said second microphone.

* * * * *